Figure 1:
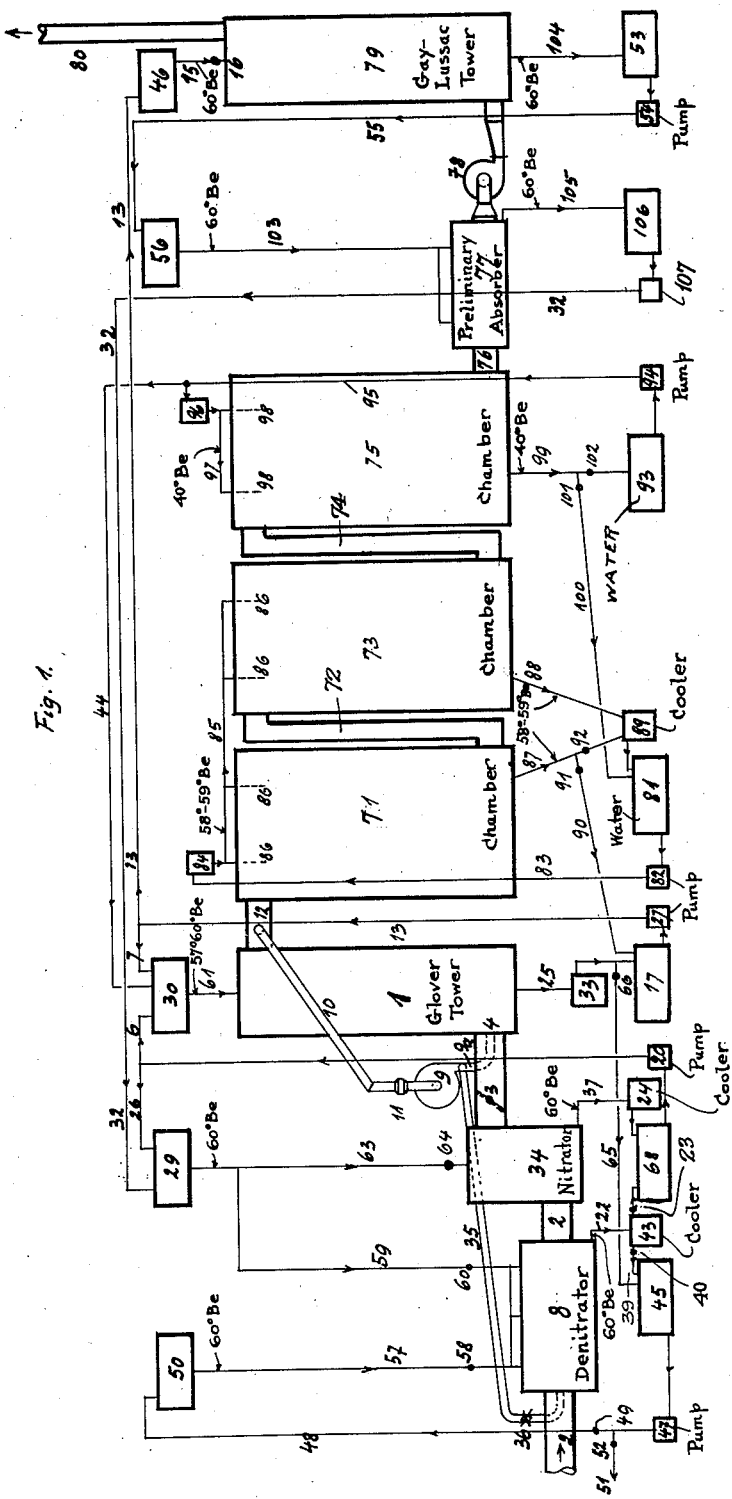

Patented June 25, 1935

2,006,031

UNITED STATES PATENT OFFICE 2,006,031

APPARATUS FOR THE MANUFACTURE OF SULPHURIC ACID

Erich Rothammel, Pforzheim, Germany, assignor to the firm Sulfurit S. A., Basel, Switzerland Application April 5, 1929, Serial No. 352,844

5 Claims. (Cl. 23—261)

This invention relates to an apparatus for economically producing sulphuric acid of 60° Bé., a Glover apparatus being employed exclusively for producing sulphuric acid.

A Glover apparatus to-day generally serves exactly the same purpose as hitherto, namely to denitrate the nitrous acid flowing thereover and to vaporize the free water remaining in the acid, utilizing the heat contained in the hot gases, to concentrate the uncombined acid. A certain new production is thereby obtained in the uppermost zones shortly below the gas outlet, which amounts on an average to 16 to 18% of the daily production.

The intensive productional activity of the Glover tower according to the present invention has the result that the apparatus connected up with the Glover tower is not effected by non-uniform concentration of the roasting gases, as it receives gases which have been already used up as far as possible. The share of production of the Glover apparatus increases, according to the present invention, up to 60% of the total production of the system and in some instances beyond this. This also means that the subsequent apparatus can be considerably smaller than hitherto. If, for example, the usual lead chambers are added to the Glover tower, the chamber space can be reduced whilst retaining the same daily output. The output of the chambers themselves may also be increased per cubic meter of chamber volume. By adding suitable apparatus existing Gay-Lussac absorption chambers may be enlarged and therefore an increased output of the system obtained without difficulty, especially as according to the process of the present invention, this absorption apparatus is relieved.

By all these measures sulphuric acid absolutely denitrated is obtained the strength of which can be regulated in a simple manner within wide limits during the process without interruption, from the weakest to the strongest concentration of the Glover acid and if necessary even beyond same, all idle running of the individual apparatus being at the same time prevented by the measures taken.

An embodiment of the invention is illustrated by way of example in the two figures of the accompanying drawings.

A conduit 2 leading from the roasting plant leads to a denitrator 8 and thence through a nitrator 34 and a regulating device 3 to a nozzle 4 of the injector type, arranged on a suitable part of a Glover tower 1, with which nozzle is connected an exhauster 9 with regulating device 11 and pipe 10 terminating in the Glover discharge pipe 12, at the top of the Glover tower. A pipe 35 with regulating device 36 leads from the pressure line 9a of the exhauster 9 to the inlet of the gas conduit 2 into the denitrator 8.

The Glover discharge pipe 12 leads to a chamber 71, the lower end of which is connected by a conduit 72 to the top of a chamber 73, which latter is similarly connected by a conduit 74 to a chamber 75, which latter is connected by a conduit 76 to a preliminary absorber 77, communicating through an exhauster 78 with a Gay-Lussac apparatus 79 discharging into the open through a conduit 80.

A conduit 63 with control element 64 leads from the high vessel 29 to the nitrator 34 and a conduit 59 branching from the conduit 63 and having a regulating device 60 leads to the denitrator 8. A conduit 37 connects the nitrator 34 with a cooling device 24, a low level supply vessel 68, and a pump 20, the riser pipe 26 of which returns to the high vessel 29 and branches off through the conduit 6 to the Glover high vessel 30, from which the conduit 61 leads to the Glover tower 1.

In Fig. 1, conduit 57 with regulating device 58 extends from the high vessel 50 to the denitrator 8, the discharge of which passes through the conduit 22 to cooler 43, and from there, on the one hand, to vessel 68 by way of a conduit provided with a regulator 23, and from vessel 68 to the pump 20; on the other hand, to low level supply vessel 45, by way of conduit 39 with regulator 40, and from the vessel 45 to a pump 41, the riser pipe 48 of which with regulator 49 leads back to the high vessel 50. Conduit 51 containing regulator 52 leads to acid storage vessels.

Figure 2:
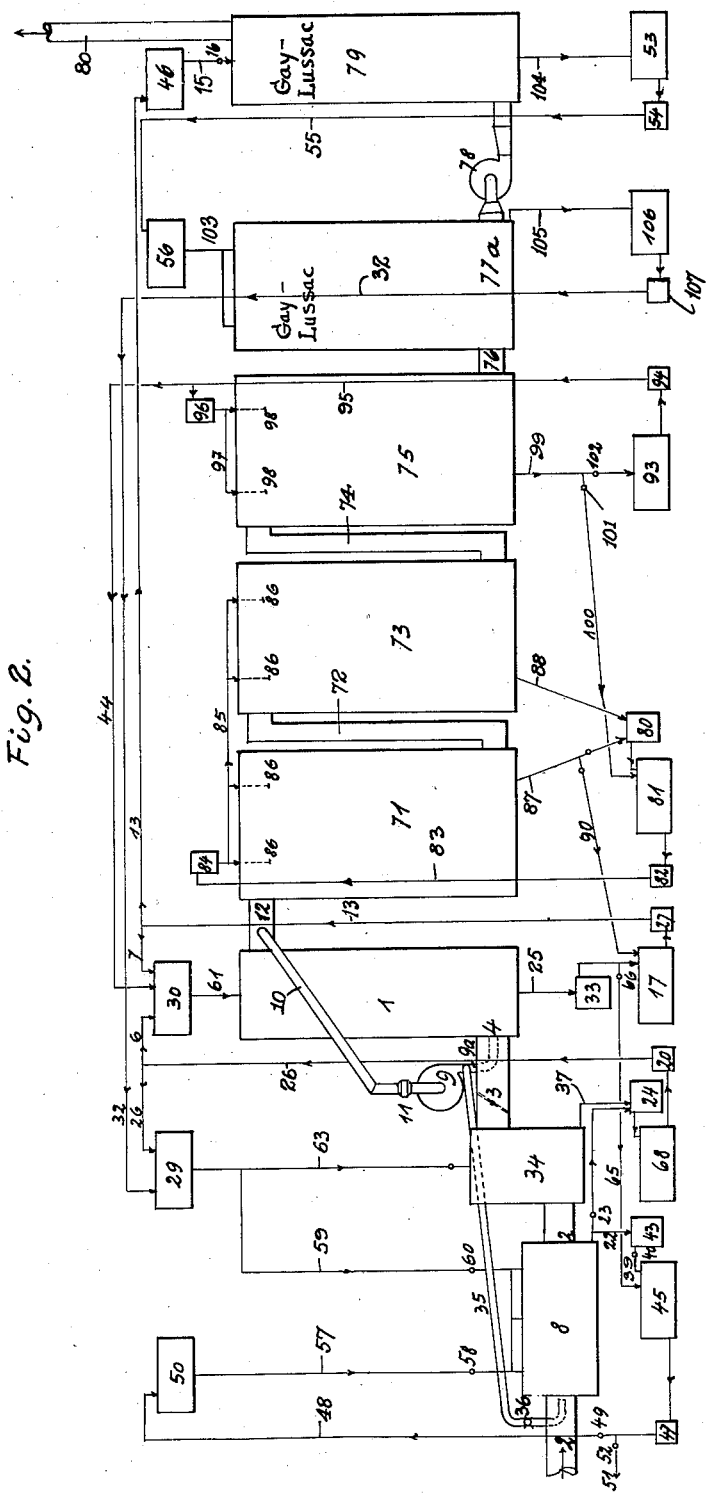

In Fig. 2 is shown a modification of the acid flow from denitrator 8. Acid from denitrator 8 flows through conduit 22 and in part passes through the branch of conduit 22, provided with a regulator 23, to cooler 24 and from the latter acid flows to vessel 68 and pump 20. The other part of the acid flowing in conduit 22 passes to cooler 43, flows through conduit 39, provided with regulator 40, to low level supply vessel 45 and from there to a pump 47.

The Glover liquid discharge conduit 25 leads through the cooling device 33, a low level vessel 17 to a pump 27, the riser pipe 13 of which leads on the one hand to the Gay-Lussac high vessel 46 and on the other hand through the conduit 7 back to the Glover high vessel 30.

Conduit 65 with regulator 66 leads to the low vessel 45.

Conduit 15 with regulator 16 leads from the Gay-Lussac high vessel 46 to the Gay-Lussac tower 79, and from the latter the conduit 104 leads to the low level vessel 53 and to pump 54, the riser pipe 55 of which leads to the high vessel 56. From here the conduit 103 leads to the preabsorber 77 from which a conduit 105 leads to a low level vessel 106 and to a pump 107, the riser pipe 32 of which leads back to the high vessel 29.

A pump 82 is connected to the vessel 81, the riser pipe 83 of this pump terminating in the pressure vessel 84, the discharge conduit 85 with the spraying elements 86 leading to the chambers 71 and 73, which in turn are connected to the low vessel 81 through the discharge conduits 87 and 88 and cooling device 89, a regulator 92 being provided in the conduit 87. A conduit 90 with regulator 91 leads back to the low vessel 17 from the conduit 87.

A pump 94 is connected to the vessel 93, the riser pipe 95 of this pump terminating in the pressure vessel 96, the discharge conduit 97 of which with the spraying elements 98 leads to the chamber 75. This chamber is connected to the low vessel 93 through the conduit 99 with regulator 102. The conduit 100 with regulator 101 leads back to the low vessel 81, whereas the riser pipe 95 is connected to the Glover high vessel 30 through the conduit 44. A suitable spraying nozzle of any known type may be employed for spraying acid into the Glover tower.

The operation is as follows:—

The roaster gases arriving in the conduit 2 first pass through the denitrator 8, in which the acid fed from the high vessel 50 through the conduit 57 is subjected to the action of the roaster gases still containing their full percentage of $SO_2$ and is thereby denitrated, giving up its nitrous oxides to the gas current passing through and thereby continuously slightly prenitrating the gases. The denitrated acid is forced out through the conduit 51.

The prenitrated gases pass to the nitrator 34, which is sprayed with the whole of the high nitrous acid coming from the Gay-Lussac apparatus. The nitrogen oxides are for the greater part driven out by the sulphurous acid, and pass entirely into the gas current passing through, which is nitrated to the strongest possible degree. On leaving the nitrator the roasting gases are therefore charged with the greatest possible excess nitrogen oxides and intimately mixed and arrive in this condition at the Glover gas nozzle 4.

Of the waste gases oversaturated with nitrogen oxides, passing off from the Glover tower 1 to the chambers, a portion is drawn off by the exhauster 9 through conduit 10 and regulator 11 and again forced into the Glover tower through the injector nozzle 4. In the nozzle the pressure exerts a suction which prevails in the nitrator 34 in the conduit 2, and back to the roasting furnace, so that the roasting process is influenced in a most favorable manner.

The gases injected into the Glover tower 1 turbulently mix with the gases arriving from the conduit 2 so that an extremely intensive new formation of sulphuric acid begins even in the lowermost zones of the Glover tower. The sprayed and flowing off acid remains almost free of nitrogen oxides in spite of the presence of these nitrous oxides because the gases at this point still contain a high percentage of $SO_2$ and effectively prevent any appreciable absorption. The remaining pressure of the exhauster 9, exerts a conveying action upon the gas mixture exclusively in the sense of the proper draught through the Glover tower to the next apparatus. The suction and pressure effect can be adjusted by the regulator 11.

The acid flowing off from the nitrator 34, which is still slightly nitrous, collects in the low vessel 68 and is forced back by the pump 20 through the conduit 26 partly into the high vessel 29 and partly into the Glover high vessel 30. The Glover discharge acid, which is practically free from nitrous compounds, collects in the low vessel 17 and is forced by the pump 27 partly to the Gay-Lussac high vessel 46 through the conduit 13 and partly back to the Glover high vessel 30 through the conduit 7. The partial returning of the discharge acid from the nitrator 34 and Glover tower 1 into their initial vessels 29 and 30 is intended merely to have suitable quantities of cooling acid always available for leading off the large quantites of heat prevailing in this apparatus. A suitable portion of the daily production of the Glover discharge acid practically free from nitrogen is fed through the conduit 65 into the vessel 45 and therefore into the internal circulation of the denitrator in order to there receive its final treatment and final denitration.

After denitration of the daily production the denitrator 8, can, if necessary, be connected up with the production process for the rest of the day. It then receives the Gay-Lussac acid with high nitrogen content from the high vessel 29 through the conduit 59, which acid gives up its nitrogen oxides to the washing gases passing through the denitrator 8, and thereby strongly nitrates these gases. For intensifying and accelerating the nitration, Glover discharge gases with a high percentage of nitrogen oxides may be injected into the denitrator 8 through the extension conduit 35 with regulator 36 by the exhauster 9 in analogous manner to that used in the case of the Glover tower 1. If desired the entire quantities drawn off may be led through the denitrator 8 in order to there effect the strongest nitration even at the commencement of the process. The fresh nitric acid etc., added to the system, is preferably passed through the nitrator 34, so that it also becomes fully effective as early as possible in the process.

Therefore by means of the new process strongly or weakly prenitrated gases are supplied, and the nitrator 34 itself further continually nitrates the roaster gases most intensely, so that the Glover tower receives roaster gases nitrated to the highest degree even in its lowermost admission zone. To these are added the quantities of nitrous substances drawn off and maintained in continuous circulation by the exhauster 9. The Gay-Lussac apparatus is permanently relieved by these last quantities, which are never withdrawn from the actual sulphuric acid production process, as they need never be absorbed. Accordingly the entire quantity of nitrous substances circulating in the system can be chosen correspondingly larger than usual, the Gay-Lussac apparatus being nevertheless not more heavily loaded, whereas increased reactions occur in the production apparatus.

The acid flowing into the Glover is preferably maintained at only about 57 to 58° Bé., as the sulphuric acid formation in the Glover increases the strength of the acid to the discharge strength of at least 60° Bé. The gases flowing off are oversaturated with nitrogen oxides, but only contain a small quantity of $SO_2$. The inflowing acid will consequently absorb a certain quantity of nitrous oxides and return the same automatically into lower Glover tower zones, where they again are given up to the gas current flowing through, the internal gas tension and therefore the reaction speed being considerably increased at these points.

This continuous, internal automatic alternating process will, on the one hand, considerably facilitate the fresh formation of sulphuric acid in these tower parts and, on the other hand, relieve the Gay-Lussac apparatus by the quantities of nitrogen oxides held back, which in turn are again introduced where the $SO_2$ content of the gases decreases considerably.

Several denitrators 8 and nitrators 34 can be arranged in front of the Glover tower according to the size of the system.

Nitrous sulphuric acid of 58 to 60 Bé. is finely sprayed by the spraying elements 86 under the pressure of the pump 82 into the chambers 71 and 73 in a closed circulation, and therefore the entire chamber space is continually filled with a finely divided acid rain. The flue gases discharged from the Glover tower 1 and not withdrawn by the exhauster pipe 10 first pass through this fine continuous rain in chambers 71 and are turbulently mixed continually by the falling acid drops. Thus, on the one hand, nitrous oxides are released there at first from the acid (the $SO_2$ still present therefore exerting a denitrating effect on the sprayed acid), which oxides, together with the excesses of nitrous oxides coming from the Glover tower convert the remaining $SO_2$ quickly for the greatest part into $H_2SO_4$ through the continual mixing and gyrating of the gases. In the chamber 73 the $SO_2$ content of the gas mixture passing through already drops considerably, so that it is no longer capable of preventing a strong absorption of the nitrous oxides by the sprayed acid which is itself exactly the same as that of the preceding chamber 71. The acid flowing off from the chamber 73 will therefore have a larger nitrogen content, than that of the chamber 71. As the two acids again unite in the low vessel 81 and mix, an acid with nitrogen content results therewith, the nitrogen content of which can continually adjust itself and requires no external addition of nitrogen compounds. This is possible only because the Glover apparatus uses up the roaster gases to a very great extent and these consequently can no longer effect a denitration of the acid flowing through the chamber 71.

In order to convert the remaining $SO_2$ in the gases into $H_2SO_4$ on leaving the chamber 73, the chamber 75 is also sprayed with a thin very diluted acid of about 40° Bé. in a closed circulation entirely separate from the previous circulation. The gas mixture entering the chamber 75 has a high excess of nitrogen oxides and oxygen, to which is added an excess of water in the shape of most finely sprayed highly diluted acid. Through the simultaneous cooperation of these three factors all the remaining $SO_2$ is entirely converted into $H_2SO_4$. The strength of the sulphuric acid here circulating should, as far as possible, not exceed 40° Bé. Therefore, in order to maintain this strength, a suitable quantity of water is added to the circulation in the low vessel 93 or at some other suitable place. The portion of the production at this point is fed to the chamber vessel 81 through the conduit 100, it being possible to always adjust the quantity accurately by the regulators 101—102. Thus the production in the chamber 75 in the form of 40° acid passes into the circulation of the chambers 71 to 73, where it is concentrated for the first time to 58 to 60° Bé. The quantities produced here are fed to the Glover-Gay Lussac circulation through the conduit 90 and there receive their final treatment followed by their denitration.

The apparatus connected up behind the Glover tower may also be different from that above described, and for example consist of towers etc. Its manner of operation depends entirely upon the principles above set forth.

If the capacity of an existing sulphuric acid producing plant is to be considerably enlarged by introducing the process, the Gay-Lussac apparatus must also be extended either by adding a further Gay-Lussac tower or, as shown in the drawings, by building in a preabsorber 77 of any suitable construction, which in this instance would replace the Gay-Lussac I. The old Gay-Lussac tower 79 first receives the weakest nitrous acid from the high vessel 46 which after passing through the tower 79 is led through the preabsorber 77, where it becomes fully saturated with nitrous oxides, i. e. in a similar manner to that usual to-day when several Gay-Lussac towers are employed.

Fig. 2 of the drawings shows diagrammatically the same installation as shown in Fig. 1, except that in place of the absorber 77, a Gay-Lussac tower 77a is substituted. The operation is the same as in Fig. 1.

I claim:

1. An apparatus for producing sulphuric acid by oxidizing $SO_2$-containing gases by means of nitrogen oxides in the presence of water, comprising a denitrator, an inlet conduit for $SO_2$-containing hot gases for said denitrator, at least one intake conduit for nitrous vitriol for said denitrator, at least one discharge conduit for denitrated vitriol from the said denitrator, a nitrator, a gas conveying conduit between the denitrator and the nitrator, at least one intake conduit for nitrous vitriol into the nitrator, at least one discharge conduit for nitrous vitriol from the nitrator, a Glover tower, at least one intake conduit for nitrous vitriol to said Glover tower, a device for spraying the hot ascending gases therein with nitrous vitriol, a gas inlet conduit between the nitrator and the Glover tower, a regulating element in this conduit, a pressure conduit for the gases extending into the gas inlet conduit and having an injector nozzle adapted to draw gases from the nitrator into the Glover tower at the nozzle inlet to the latter, a connecting conduit to subsequent treatment containers passing from the upper part of the Glover tower, a suction conduit from said connecting conduit, a single exhauster connected to the said pressure conduit and also to the said suction conduit, a regulating element on the exhauster for the aspirated and forced gas currents, at least one discharge conduit for nitrous vitriol from said Glover tower, at least two subsequent-treatment containers for the gases escaping from the Glover tower and not withdrawn by the suction conduit, at least one elevated and one low-lying supply vessel serving each treatment vessel in respect of the introduced and discharged liquids, and a Gay-Lussac tower for absorbing the remainder of the nitrogen oxides by means of nitrous vitriol.

2. An apparatus for producing sulphuric acid by oxidizing $SO_2$-containing gases by means of nitrogen oxides in the presence of water, comprising a denitrator, an inlet conduit for SO₂-containing hot gases to said denitrator, at least one intake conduit for nitrous vitriol to said denitrator, at least one discharge conduit for denitrated vitriol from the said denitrator, a nitrator, a gas conveying conduit between the denitrator and the nitrator, at least one intake conduit for nitrous vitriol into the nitrator and at least one discharge conduit for nitrous vitriol from the nitrator, a Glover tower, at least one intake conduit for nitrous vitriol to said Glover tower, a device for spraying the hot ascending gases therein with nitrous vitriol, a gas inlet conduit between the nitrator and the Glover tower, a regulating element in this conduit, a pressure conduit for the gases extending into the gas inlet conduit and having an injector nozzle adapted to draw gases from the nitrator into the Glover tower at the nozzle inlet to the latter, a connecting conduit to subsequent-treatment containers passing from the upper part of the Glover tower, a suction conduit from said connecting conduit, a single exhauster connected to the said pressure conduit and also to the said suction conduit, a regulating element on the exhauster for the aspirated and forced gas currents, a branch conduit proceeding from the said pressure conduit and extending into the gas conveying conduit before the denitrator, said branch pressure conduit exerting injector action at the inlet of the gas conveying conduit into the denitrator, the branch conduit being provided with a controlling element for the gas current which is forced therethrough, at least one discharge conduit for nitrous vitriol from said Glover tower, at least two subsequent-treatment containers for the gases escaping from the Glover tower and not withdrawn by the suction conduit, at least one elevated and one low-lying supply vessel serving each of the reaction vessels and containers in respect of introduced and discharged liquids, and a Gay-Lussac tower for absorbing the remainder of the nitrogen oxides by means of nitrous vitriol.

3. Device for making sulphuric acid from gases containing SO₂ and nitrogen oxides in the presence of water, comprising a denitrator, a nitrator, and a Glover tower having a draw-off conduit at its upper end, a supply conduit for SO₂-containing gases leading to the denitrator, gas conveying conduits between all three vessels for intermixing the gases to be reacted, means in the Glover tower for treating ascending gases with descending nitrous vitriol, a connecting conduit located outside of the Glover tower and comprising a suction conduit leading from the draw-off conduit of said tower and a pressure conduit extending injector-wise through the connecting conduit between the nitrator and the Glover tower, a single exhauster between and connecting said suction and pressure conduits adapted to lead gases from the upper part of the Glover tower to the lower part thereof, an injector nozzle at the end of the pressure conduit, the effective cross section of the suction conduit having a ratio of about 1:3 to that of the draw-off conduit, chambers for the subsequent-treatment of that portion of the gas mixture which flows on in the draw-off conduit, said chambers being provided with devices for spraying ascending gas currents with descending nitrous vitriol, the first and second chambers being interconnected through at least one conduit, means in both chambers for returning the spraying liquid to the top thereof, conduits and containers for mixing the nitrous vitriol discharging from both chambers and again returning the mixture to the top of the chambers, a gas discharge conduit extending from the last chamber, a preliminary absorber connected to said discharge conduit and provided with devices for spraying ascending currents of gas with nitrous vitriol, discharge conduits for the spraying liquid from the absorber, at least one Gay-Lussac tower connected to the preliminary absorber and having a spraying device for treating ascending gases with nitrous vitriol, a draw-off pipe for gases from said Gay-Lussac tower, and at least one discharge device for nitrous vitriol containing large amounts of nitrogen oxides leading from the Gay-Lussac tower.

4. An apparatus for producing sulphuric acid by oxidizing SO₂-containing gases by means of nitrogen oxides in the presence of water, comprising a denitrator, an inlet conduit for SO₂-containing hot gases for said denitrator, at least one intake conduit for nitrous vitriol for said denitrator, at least one discharge conduit for denitrated nitrous vitriol from the said denitrator, a nitrator, a gas conveying conduit between the denitrator and the nitrator, at least one intake conduit for nitrous vitriol into the nitrator, at least one discharge conduit for nitrous vitriol from the nitrator, a Glover tower, at least one intake conduit for nitrous vitriol to said Glover tower, a device for spraying the hot ascending gases therein with nitrous vitriol, a gas inlet conduit between the nitrator and the Glover tower, a regulating element in this conduit, a pressure conduit for the gases extending into the gas inlet conduit and having an injector nozzle adapted to draw gases from the nitrator into the Glover tower at the nozzle inlet to the latter, a connecting conduit to subsequent-treatment containers passing from the upper part of the Glover tower, a suction conduit from said connecting conduit, a single exhauster connected to the said pressure conduit and also to the said suction conduit, a regulating element on the exhauster for the aspirated and forced gas currents, at least one discharge conduit for nitrous vitriol from said Glover tower, at least two subsequent-treatment containers for the gases escaping from the Glover tower and not withdrawn by the suction conduit, at least one elevated and one low-lying supply vessel serving each of the reaction vessels and containers, in respect of the introduced and discharged liquids, and two Gay-Lussac towers adapted to absorb the remainder of the nitrogen oxides by means of nitrous vitriol.

5. An apparatus for producing sulphuric acid by oxidizing SO₂-containing gases by means of nitrogen oxides in the presence of water, comprising a denitrator, an inlet conduit for the hot gases for said denitrator, at least one intake conduit for nitrous vitriol for said denitrator, at least one discharge conduit for denitrated nitrous vitriol from the said denitrator, a nitrator, a gas conveying conduit between the denitrator and the nitrator, at least one intake conduit for nitrous vitriol into the nitrator, at least one discharge conduit for nitrous vitriol from the nitrator, a Glover tower, at least one intake conduit for nitrous vitriol to said Glover tower, a device for spraying the hot ascending gases therein with nitrous vitriol, a gas inlet conduit between the nitrator and the Glover tower, a regulating element in this conduit, a pressure conduit for gases extending into the gas inlet conduit and having an injector nozzle adapted to draw gases from the nitrator into the Glover tower at the nozzle inlet to the latter, a connecting conduit to subsequent-treatment containers passing from the upper part of the Glover tower, a suction conduit from said connecting conduit, a single exhauster connected to the said pressure conduit and also to the said suction conduit, a regulating element on the exhauster for the aspirated and forced gas currents, at least one discharge conduit for nitrous vitriol from said Glover tower, at least two subsequent-treatment containers for the gases escaping from the Glover tower and not withdrawn by the suction conduit, at least one elevated and one low-lying supply vessel serving each reaction vessel in respect of the introduced and discharged liquids, a preliminary absorber connected to the last subsequent-treatment container for the gases coming from the Glover tower and adapted to absorb a portion of the nitrogen oxides contained in the gases coming from the Glover tower by means of nitrous vitriol, and connected thereto a final absorber of the Gay-Lussac type for freeing the gases from the last remainders of nitrogen oxides and yielding a nitrous vitriol which is saturated with nitrogen oxides.

ERICH ROTHAMMEL.